Patented Sept. 27, 1949

2,483,246

UNITED STATES PATENT OFFICE 2,483,246

SEPARATION OF PRIMARY, SECONDARY, AND TERTIARY ALCOHOLS BY AZEOTROPIC DISTILLATION

Josephine M. Stribley, Long Beach, Calif., assignor to Union Oil Company of California, Los Angeles, Calif., a corporation of California No Drawing. Application April 16, 1945, Serial No. 588,717

9 Claims. (Cl. 202—42)

This invention relates to a process of azeotropic distillation to prepare pure alcohols from complex organic fractions which are difficult to separate by means of ordinary fractional distillation due to small differences in the boiling points existing between the components in the fraction. More particularly the invention relates to a process of azeotropic distillation for separating complex alcohol mixtures which are difficult to separate by means of ordinary fractional distillation due to small differences in the boiling points of the alcohols in the mixture.

The process of separating one component from another component of substantially the same boiling point contained in a complex organic fraction by azeotropic distillation is well kown. This process consists of distilling the fraction in the presence of an extraneous substance which has a preferential affinity for one of the components contained in the fraction thus causing a disturbance in the vapor pressure equilibrium that formerly existed in the fraction in such a manner that the partial vapor pressure or fugacity of at least one component within the fraction is changed sufficiently to permit its separation by controlled fractional distillation. Such an azeotroping process has found widespread usage in the treatment of hydrocarbon fractions, alcohol-ketone mixtures, and the like for the purpose of separating components of one structural type from components of another structural type. In such operation the azeotrope former employed has the effect of increasing the vapor pressure of the components of one structural type in the fraction, thus permitting their removal from the fraction as an overhead distillate together with the azeotrope former. In the present description of my invention, the aforesaid type of distillation will hereinafter be referred to as "azeotropic distillation" and the overhead product or products consisting of the azeotrope former together with the component or components most effected by said azeotrope former will be hereinafter referred to as the "azeotropic distillate" while the residue remaining as bottoms in the azeotropic distillation referred to as "azeotropic bottoms."

The process of azeotropic distillation for the separation of compounds within a series of compounds is of considerable importance. For example, in complex mixtures of alcohols there are, in many cases, alcohols within the mixture having such small boiling point differences that their separation by conventional fractional distillation is extremely difficult. Thus, it is found that the primary, secondary and tertiary alcohols of increasing molecular weight may boil within a few degrees centigrade of each other. For example, ethyl alcohol, isopropyl alcohol, and tertiary butyl alcohol boil in a range of 4.3° C. and similarly normal propyl alcohol, secondary butyl alcohol and tertiary amyl alcohol boil within a range of 4.6° C. Because of this small difference in boiling points such alcoholic mixtures are virtually impossible to separate by fractional distillation.

Complex alcoholic mixtures result in many cases in conventional preparation methods. Thus in the hydration of mixed olefins, fermentation of starch, chlorination and hydrolysis of aliphatic hydrocarbons and the destructive distillation of wood, methods commonly employed for the preparation of alcohols, complex mixtures often occur, depending upon the type of operation, which contain varying proportions of primary, secondary and tertiary alcohols.

It is a primary object of my invention to further the progress in the art of the separation of alcohols by the process of azeotropic distillation which is simpler and more efficient than ordinary chemical separation methods.

It is a further object of my invention to separate primary, secondary, and tertiary alcohols which are difficult to separate by means of ordinary fractional distillation due to small differences existing in their boiling points and due further to deviation from ideal solution properties which may be exhibited by such alcohol mixtures.

It is another object of the present invention to effect the separation of the primary, secondary and tertiary alcohols when such alcohols are contaminated with other organic compounds such as ketones, aldehydes, and the like.

A more specific object of my invention is to perform the separation of alcohols of small boiling point differences by means of azeotropic distillation.

Other objects and advantages will occur to those skilled in the art as the description thereof proceeds.

I have discovered that it is possible by employing the azeotrope formers as hereinafter disclosed to improve the separation of the primary, secondary and tertiary alcohols. As azeotrope formers for this separation I have found hydrocarbons, organic esters and ketones to be particularly effective in the order mentioned. These compounds when boiling within certain limits of the alcoholic mixture were found to form azeotropes with each of these types of alcohols, the azeotropic mixtures boiling farther apart than the alcohols themselves. In this regard it appears that the azeotropic drop, that is, the difference in the boiling points of the azeotrope and of the lower boiling component or components of a complex mixture is of greater significance than might be expected. It has been reported in the literature and is confirmed by my investigation that azeotropes of a given boiling point spread are in many cases more readily separated by fractional distillation than are the components of the same boiling point spread. In this manner an azeotrope with a given alcohol boiling only slightly below an azeotrope with a second alcohol is considerably more readily separated from the second azeotrope than are the alcohols themselves. Thus I have found that by forming azeotropes with the alcohols in a narrow boiling mixture of primary, secondary and tertiary alcohols that the ease of separation is greatly increased although the spread in boiling point of the azeotropes thus formed is only slightly greater than the spread of boiling point of the alcohols themselves. For example in a mixture of ethyl alcohol, boiling point 78.5° C., isopropyl alcohol, boiling point 82.3° C., and tertiary butyl alcohol, boiling point 82.8° C., the difference in boiling points between the primary and secondary alcohol is 3.8° C., between the secondary and tertiary is 0.5° C., and between the primary and tertiary alcohol is 4.3° C. By distilling these alcohols in the presence of a hydrocarbon such as for example normal heptane forming an azeotrope between normal heptane and the ethyl alcohol, boiling at 70.9° C., between the normal heptane and the isopropyl alcohol boiling at 76.3° C. and between the normal heptane and tertiary butyl alcohol boiling at 78.0° C. the ease of separation of these alcohols is increased over and above what might be expected by the comparatively small increase in the spread of their boiling point. This increase in the example given being less than 3° C. in each case. We have found this effect to be consistent throughout the range of alcoholic mixtures when employing the azeotrope formers disclosed.

For the purposes of the separation of these alcohols I may employ as azeotrope formers the hydrocarbons such as the aromatic hydrocarbons boiling not more than 20° C. below or 40° C. above the average boiling point of the alcohol mixture and the aliphatic hydrocarbons boiling not more than 25° C. below or 50° C. above the average boiling point of the alcohol mixture, the esters of the organic and inorganic acids, which may be divided into oxygen containing esters and halogenides, which esters in order to be effective azeotrope formers must boil not more than 20° C. below or 20° C. above the alcohol mixture and the ketones boiling within the range of 15° C. below to 15° C. above the average boiling point of the alcohol mixture. Thus in the separation of ethyl alcohol, isopropyl alcohol, and tertiary butyl alcohol boiling within the range of 78° C. to 83° C. I may employ such aromatic azeotrope formers as benzene or toluene, aliphatic hydrocarbons such as hexane, heptane, 2,5-dimethylhexane, 2-methylheptane, and the like; halogenides, such as isobutyl chloride, chloroform, iodoethane, isopropyl iodide, carbon tetrachloride, and the like; oxygen esters such as methyl borate, ethyl nitrate, normal propyl formate, methyl acetate, methyl propionate, methyl carbonate, and the like; ketones such as methyl ethyl ketone, methyl isopropyl ketone, and the like. Similarly in the separation of a mixture of normal propyl alcohol, secondary butyl alcohol, and tertiary amyl alcohol, boiling in the range of 97° C. to 102° C. I may employ those azeotrope formers conforming to the boiling point limitations hereinbefore given such as for example, toluene, xylene, 2,5-dimethylhexane, normal octane, 1 - chloropentane, 1 - bromobutane, 1-bromopentane, normal butyl formate, normal amyl nitrite, diethyl ketone, ethyl isopropyl ketone, and the like.

In like manner other close boiling mixtures of primary and secondary alcohols, primary and tertiary alcohols, secondary and tertiary alcohols or primary, secondary and tertiary alcohols may be separated by the use of azeotrope formers selected from the aromatic hydrocarbons boiling in the range of 20° C. below to 40° C. above the average boiling point of the mixture; the aliphatic hydrocarbons boiling within the range of 25° C. below to 50° C. above the mixture; halogenides and oxygen esters boiling in the range of 20° C. below to 20° C. above the average boiling point of the mixtures; and the ketones boiling in the range of 15° C. below to 15° C. above the mixture.

In employing these azeotrope formers in the separation of a binary or ternary alcohol mixture, the amount of azeotrope former employed will be a function of the desired separation. Thus in a mixture of close boiling primary, secondary and tertiary alcohols it may be desired to separate therefrom only the primary alcohols in which case an amount of azeotrope former must be employed at least sufficient to form an azeotrope with the primary alcohol. In most cases the ratio of the alcohol to the azeotrope former in the ultimate azeotrope is in the range of 50% or more alcohol to less than 50% of azeotrope former. This very desirable ratio is particularly apparent in the case of the hydrocarbon azeotrope formers and in some instances may be as high as 75% alcohol to 25% azeotrope former. It should be pointed out, however, that the presence in such a ternary mixture of only a sufficient amount of azeotrope former to distill overhead, the primary alcohol will not effect a temperature spread within the mixture equivalent to the difference in the boiling point of the azeotrope formed with the primary alcohol and the boiling point of the secondary and tertiary alcohol inasmuch as while the azeotrope former is present in the mixture the effective boiling point spread is equivalent only to the boiling point spread of the azeotropes formed with each of the alcohols in the mixture.

The presence of any azeotrope former in the mixture capable of forming azeotropes with two or more of the alcohols present will result in a maximum boiling point difference corresponding to the difference in the boiling points of the azeotropes formed between the azeotrope former and these alcohols until all of said azeotrope former has been taken overhead with the primary alcohol. However, this phenomena does not interfere with the effectiveness of my invention inasmuch as I am able to obtain improved separation by the formation of the azeotropes as hereinbefore described even in those cases where sufficient azeotrope former is present to form azeotropes with all of the alcohols in the mixture.

It is within the scope of my invention to use any manner of separation of the azeotrope former from the alcohol azeotrope obtained in the azeotrope distillate such as for example secondary azeotropic distillation, solvent extraction, extractive distillation or the like. The particular method employed for separating or breaking the azeotrope is a function of the individual azeotrope formers, of the availability of the solvent, or secondary ozeotrope formers and of the equipment available and is not peculiar to the process of my invention.

The preferred azeotrope formers for the separation of these alcohols are the hydrocarbons including the aromatic and aliphatic hydrocarbons which hydrocarbons are preferred primarily because of their availability, the ease of breaking the azeotropes formed, by simple water washing and subsequent distillation of the water-alcohol extract, and also of the greater azeotropic spread resulting by the use of these hydrocarbons. It is, however, to be understood that although the hydrocarbons are the preferred azeotrope formers for the above reasons, the esters and ketones are also effective for the separation and constitute an essential part of this invention.

The following example of my process will serve to illustrate the effectiveness thereof and the advantages accruing from its usage:

Example I

A mixture of 100 volumes of ethyl alcohol, boiling point 78.5° C., 100 volumes of isopropyl alcohol, boiling point 82.3° C., and 100 volumes of tertiary butyl alcohol, boiling point 82.8° C. was distilled in the presence of 140 volumes of 2,5-dimethylhexane, boiling point 109.0° C., in a fractionating column of approximately 30 theoretical plates with an internal reflux ratio of 20 to 1 with the following results:

An initial fraction was taken overhead amounting to 34.9% of the original charge comprising 90 volumes of ethyl alcohol and 63 volumes of dimethylhexane at a vapor temperature of 73.6° C. A transition fraction was obtained boiling between 73.6° C. and 79° C. representing 7.7% of the original charge and comprising 10 volumes of ethyl alcohol, 11 volumes of isopropyl alcohol and 13 volumes of dimethylhexane. A third fraction was obtained comprising the azeotrope of isopropyl alcohol and dimethylhexane boiling at 79° C. and representing 29.3% of the original charge. This fraction consisted of 62% isopropyl alcohol and 38% dimethylhexane. A second transition fraction boiling between 79° C. and 81.5° C. and comprising 6.6% of the original charge was obtained containing 31% isopropyl alcohol, 34.5% tertiary butyl alcohol, 34.5% dimethylhexane. The bottoms from this distillation amounted to 21.5% of the original charge and comprised 90 volumes of tertiary butyl alcohol and 5 volumes of dimethylhexane.

Example II

Another azeotropic distillation was performed employing toluene as the azeotrope former for the separation of normal propyl alcohol, secondary butyl alcohol and tertiary amyl alcohol. In this distillation 100 volumes of each of these alcohols boiling at 97.2° C., 99.8° C. and 101.8° C. respectively, was distilled in the presence of 180 volumes of toluene, boiling point 110.7° C., in a fractionating column of approximately 30 theoretical plates with an internal reflux ratio of 21 to 1. The initial fraction from this distillation representing 36.2% of the original charge was obtained at a vapor temperature of 92.3° C. and was comprised of 92 volumes of normal propyl alcohol and 82 volumes of toluene. A second or transition fraction, boiling between 92.3° C. and 95.3° C. comprising 5.9% of the original charge contained 8 volumes of normal propyl alcohol, 7 volumes of secondary butyl alcohol and 13 volumes of toluene. A third fraction comprising a binary azeotrope of secondary butyl alcohol and toluene in the ratio of approximately 55% of the alcohol and 45% toluene was obtained at a vapor temperature of 95.3° C. and represented 33.2% of the original charge. The transition fraction between this azeotrope and the azeotrope of tertiary amyl alcohol and toluene represented 4.5% of the original charge and was obtained at a vapor temperature of 95.3° C. to 100° C. and comprised 27.9% of secondary butyl alcohol, 25.6% of tertiary amyl alcohol and 46.5% of toluene. The bottoms from this distillation representing 20.2% of the original charge were comprised of 94.5 volumes of tertiary amyl alcohol and 3 volumes of toluene. In each of these examples the amount of the azeotrope former employed was only slightly in excess of that required to form azeotropes with the primary and secondary alcohol. As pointed out above if it were desired to only separate the primary alcohol from these mixtures a smaller amount of azeotrope former could be employed and conversely if desired to separate each of these alcohols from a complex mixture containing other organic compounds, a greater amount of azeotrope former could be employed in order to form azeotropes with each of the alcohols. The usage of these azeotrope formers and the quantities employed will be a function of the mixture to be separated and of the azeotrope former employed and must be determined under each set of conditions.

It is to be understood that my invention is not limited to the separation of ternary mixtures of primary, secondary and tertiary alcohol inasmuch as a binary mixture of any two of these alcohols may be separated by the same means. Many variations and modifications of my invention may occur to those skilled in the art without departing from the spirit and scope of the following claims:

I claim:

1. A process for the treatment of a mixture of primary, secondary and tertiary alcohols boiling in the same temperature range to separate said mixture into its constituent parts which comprises azeotropically distilling said mixture in the presence of a sufficient amount of an azeotrope former comprising an oxygen ester selected from the group consisting of alkanol nitrates, nitrites, borates, carbonates, formates, acetates, and propionates, said ester having a boiling point not more than 20° C. below and not more than 20° C. above the average boiling point of said mixture of alcohols, said azeotrope former having the effect of forming minimum boiling azeotropes with the primary, secondary and tertiary alcohols in the mixture in such a manner that the difference in boiling points of the azeotropes thus formed is greater than the difference in boiling points of the alcohols whereby the primary, secondary and tertiary alcohols may be separated from each other.

2. A process according to claim 1 wherein the azetrope former is an alkanol formate.

3. A process according to claim 1 wherein the azeotrope former is an alkanol acetate.

4. The process of claim 1 wherein the azeotrope former is an alkanol propionate.

5. A process for the treatment of a mixture of a primary and secondary alcohols boiling in the same temperature range to separate the primary alcohol from the secondary alcohol which comprises azeotropically distilling said mixture in the presence of a sufficient amount of an azeotrope former comprising an oxygen ester selected from the group consisting of alkanol nitrates, nitrites, borates, carbonates, formates, acetates, and propionates, said ester having a boiling point not more than 20° C. below and not more than 20° C. above the average boiling point of said mixture of alcohols, said azeotrope former having the effect of forming minimum boiling azetropes with said primary and said secondary alcohols whereby the lower boiling primary alcohol azeotrope is obtained in the azeotropic distillate and the higher boiling secondary alcohol remains in the azeotropic bottoms.

6. A process for the treatment of a mixture of a primary and tertiary alcohols boiling in the same temperature range to separate the primary alcohol from the tertiary alcohol which comprises azeotropically distilling said mixture in the presence of a sufficient amount of an azeotrope former comprising an oxygen ester selected from the group consisting of alkanol nitrates, nitrites, borates, carbonates, formates, actetates, and propionates, said ester having a boiling point not more than 20° C. below and not more than 20° C. above the average boiling point of said mixture of alcohols, said azeotrope former having the effect of forming minimum boiling azeotropes with said primary and said tertiary alcohols whereby the lower boiling primary alcohol azeotrope is obtained in the azeotropic distillate and the higher boiling tertiary alcohol remains in the azeotropic bottoms.

7. A process for the treatment of a mixture of a secondary and tertiary alcohols boiling in the same temperature range to separate the secondary alcohol from the tertiary alcohol which comprises azeotropically distilling said mixture in the presence of a sufficient amount of an azeotrope former comprising an oxygen ester selected from the group consisting of alkanol nitrates, nitrites, borates, carbonates, formates, acetates, and propionates, said ester having a boiling point not more than 20° C. below and not more than 20° C. above the average boiling point of said mixture of alcohols, said azeotrope former having the effect of forming minimum boiling azeotropes with said secondary and said tertiary alcohols whereby the lower boiling secondary alcohol azeotrope is obtained in the azeotropic distillate and the higher boiling tertiary alcohol remains in the azeotropic bottoms.

8. A process according to claim 1 in which the mixture of alcohols comprises ethyl alcohol, isopropyl alcohol and tertiary butyl alcohol.

9. A process according to claim 1 in which the mixture of alcohols comprises n-propyl alcohol, isbutyl alcohol and tertiary amyl alcohol.

JOSEPHINE M. STRIBLEY.

REFERENCES CITED

The following references are of record in the file of this patent:

UNITED STATES PATENTS

| Number | Name | Date |
| --- | --- | --- |
| 2,392,534 | Von Keussler | Jan. 8, 1946 |

OTHER REFERENCES

Rose et al., Bureau of Standards Journal of Research, vol. 21, page 183, (1938), copy in Sci. Lib.

Keyes, Industrial & Engineering Chem., vol. 33, pp. 1019–1021 (1949), copy in Sci. Lib.

Mair et al., Bureau of Standards Journal of Research, vol. 27, pp. 39 to 63 (1941), copy in Sci. Lib.

Ewell, Industrial and Engineering Chem. vol. 36, pp. 871–874 (Oct. 1944), copy in Sci. Lib.

Horsely "Table of Azeotropes and Nonazeotropes," Analytical Chemistry, Fol. 19, pp. 508–600 Aug. 1947 (pp. 530–531 relied on) copy in Sci. Lib.